Nov. 21, 1967     P. D. DRIER     3,353,790
LEVELING DEVICE FOR VEHICLES
Filed Oct. 7, 1965
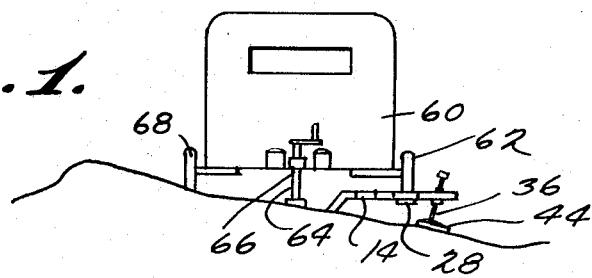
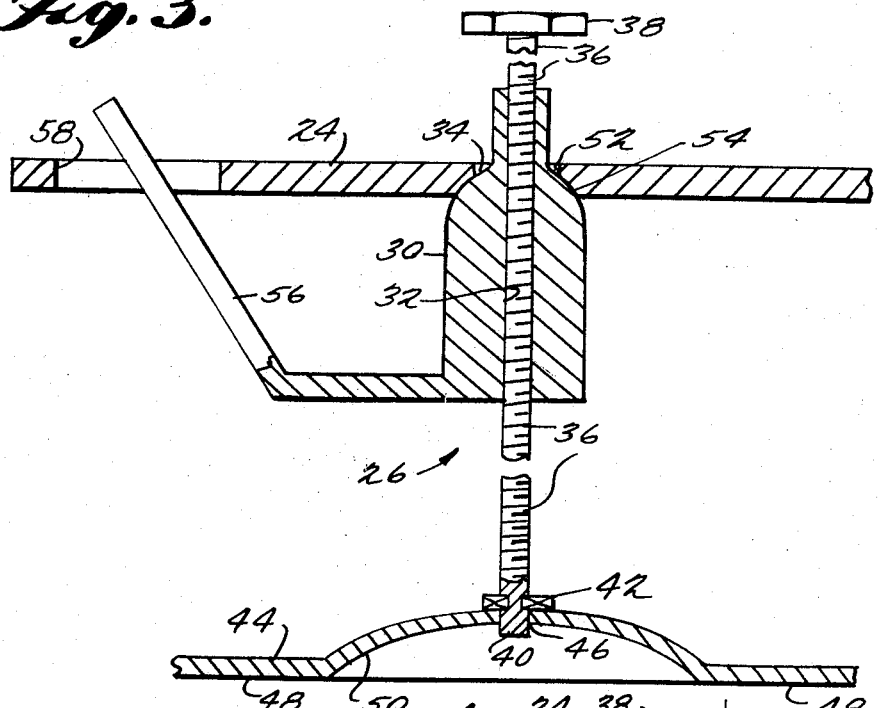
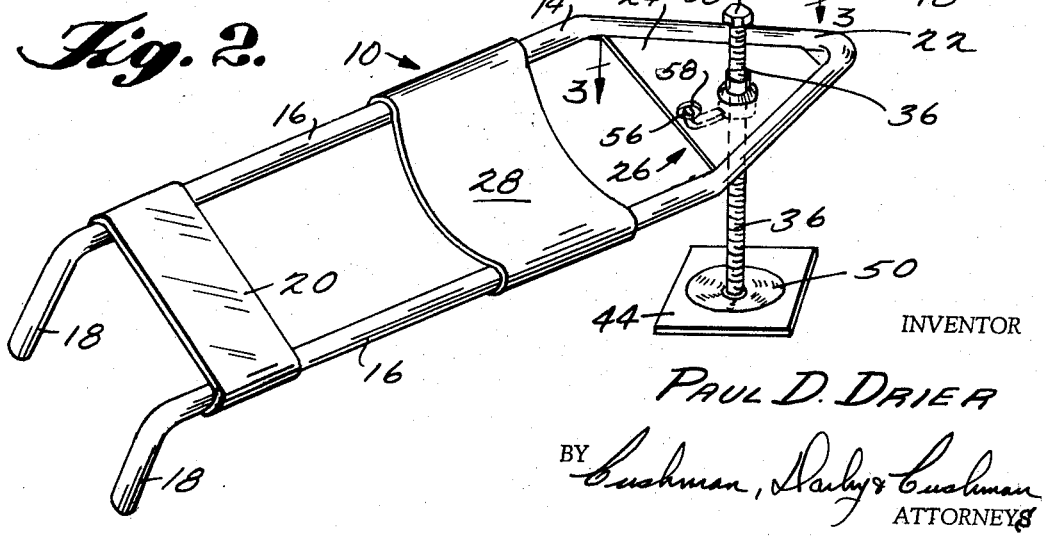
INVENTOR
PAUL D. DRIER
BY Cushman, Darby & Cushman
ATTORNEYS

United States Patent Office 3,353,790
Patented Nov. 21, 1967

3,353,790
LEVELING DEVICE FOR VEHICLES
Paul D. Drier, 26 Cedar St., Cortland, N.Y. 13045
Filed Oct. 7, 1965, Ser. No. 493,791
14 Claims. (Cl. 254—126)

ABSTRACT OF THE DISCLOSURE

Apparatus for leveling a wheeled vehicle of the type having at least one pair of axially aligned wheels spaced transversely of the vehicle comprising: an elongated body; ground engaging means at one end of said body; means at the other end of said body for raising and lowering said body other end with respect to the ground and a cradle intermediate said body one end and said body other end for receiving and supporting one of the wheels of said pair whereby raising and lowering said body other end raises and lowers said wheel respectively to bring said vehicle to a level condition.

The body is a frame of U-shaped metal with an upwardly concave cradle secured between the legs, the leg outer ends engaging the ground and the raising and lowering device being mounted to the body via a web bridging the underside of the U-shaped frame at said one end.

The foregoing abstract is not intended to be a comprehensive discussion of all of the principles, possible modes or applications of the invention disclosed in this document and should not be used to interpret the scope of the claims which appear at the end of this specification.

---

The present invention relates to vehicle elevating means and more particularly to a device for leveling ground supported wheeled vehicles such as trailers.

Trailers of the type that are adapted to be pulled behind a car or truck usually have one or more axles near or rearwardly of their longitudinal axis. Each axle supports one or more wheels for rotation adjacent each extremity thereof. Many trailers of this type, especially those which include an enclosure for use as a home, vacation abode, construction office or the like, have a vertically adjustable support located near the tongue of the trailer. The use of this support allows the trailer user to adjust the height of the front of the trailer when it is detached from the drawing vehicle so that the floor of the trailer is roughly equidistant from the trailer ground at all points. Where it is possible to park the trailer on level ground, the procedure just described, when carried out, will result in the trailer floor being substantially level. Such a leveling device is also adequate where the trailer is parked on sloping ground if the trailer can be parked so that the longitudinal axis thereof is parallel to the direction of slope of the ground since the conventional support described can be used to raise or lower the front of the trailer with respect to the distance between the trailer wheel-ground juncture and the vehicle floor depending on whatever the front of the trailer is pointed uphill or downhill.

However, upon occasion, a trailer of the type described must be parked at a location where the ground slopes and for various reasons the trailer cannot be oriented so that its front is pointed directly uphill or directly downhill. In such instances, reflection will bring the realization that no amount of manipulation of the conventional tongue mounted vertically adjustable support will bring the trailer to a level condition.

Accordingly, it is a fundamental object of the present invention to provide a device for leveling a trailer of the type described when the trailer is parked on uneven terrain or sloping ground and does not have its longitudinal axis in the imaginary vertical plane which includes the direction of slope of the ground on which the trailer is located or wherein the trailer wheels are not supported in a plane parallel to the mean surface of the earth.

A more general object of the invention is the provision of means for leveling wheeled vehicles located on uneven terrain.

These and further objects of the invention will become more clearly apparent as will the principles and scope of advantageous applicability thereof, during the following detailed discussion which relates to the exemplary embodiment of the invention shown in the attached drawing.

In the drawing:

FIGURE 1 is a somewhat diagrammatic front elevation view of a trailer leveled on uneven terrain using a leveling device of the present invention;

FIGURE 2 is an enlarged perspective view of the leveling device of FIGURE 1 and

FIGURE 3 is an enlarged fragmentary vertical sectional view taken substantially along line 3—3 of FIGURE 2.

As shown in FIGURE 2, the leveling device 10 includes a generally U-shaped body 14, terminating in legs 16. The legs 16 are both shown bent transversely in the same direction from the plane which contains the remainder of the U-shaped body to provide a pair of laterally spaced feet 18. The body is preferably composed of metal in the form of a tube, rod, I-beam or other conventional structural metal shape depending principally upon the ruggedness required for the particular end use envisaged. For instance, where light trailers are involved relatively thin walled tubular metal could be used, but where heavier trailers are concerned, heavier walled tubes or rods may be necessary.

The legs 16 and/or feet may be cross-braced at one or more points along their length as at 20 to restrict independent movement of the legs and feet and provide ruggedness to the device 10. The brace 20 merely comprises a plate which extends laterally between the legs 16 near the feet 18 and is secured to both legs 16 by being wrapped at least partly around each at its end regions and tack welded or the like to the legs.

Near the base 22 of the U-shaped body 14 a web 24 is shown bridging the distance between the legs 16. The web 24 preferably comprises a metal plate tack welded or otherwise secured to the underside of the body 14. The web 24 provides support for a height adjustable, pivotable support assembly 26 which is shown in detail in FIGURE 3 and will be more fully discussed hereinafter.

Intermediate the brace 20 and the web 24 a wheel support cradle 28 is shown extending between and secured to the two legs 16. The cradle is generally concave in the sense opposite from the sense of direction of the projection of the feet 18 and has the axis of curvature thereof generally parallel to the parallel segments of the legs 16. It is contemplated that the cradle 28 may be composed of relatively inflexible material such as metal plate, or of relatively flexible material such as fiber reinforced elastomeric material, for instance similar to automobile tires or heavy duty conveyor belts; of metalic mesh heavy canvas or the like. It is apparent that where the cradle material is flexible the axis of its curvature when in use will roughly parallel the longitudinal axis of the axle whose wheel is supported on the cradle.

Turning now to FIGURE 3, the height adjustable, pivotable support assembly 26 is shown including a nut 30 having a longitudinal bore 32 that is internally threaded throughout the length thereof. The nut 30 includes an upwardly convex spherically curved annular surface 34 near its upper end, the surface 34 being centered about the bore 32. The latter threadably receives a leveling screw 36 that has a non-circular enlarged head, such as a hex-head 38 and bearing means adjacent the opposite end 40 thereof from the head. Typical bearing means could include a thrust bearing 42 secured at its inner extent to the screw 36 by being received in a radially outwardly facing channel therein spaced a short distance above the end 40. The outer race of the bearing 42 is shown supported on a support plate 44 peripherally of an opening 46 in the plate through which the end 40 of the screw 36 projects. Alternatively, the bearing could simply be a cylindrical socket in the plate 44 and an unthreaded lower end on the screw 36. The plate 44 is adapted to be supported on the ground at 48, the central region 50 thereof being deformed upwardly concentrically with the opening 46 so that the lower end 40 of the screw does not directly engage the ground in most instances.

The web 24 has an opening 52 therethrough, preferably of a diameter sufficiently large to pass the hex-head 38 therethrough. An annular, spherically curved downwardly concave socket 54 is formed in the web 24 peripherally of the opening 52 and approximately complementarily curved with the surface 34.

The device 10 is thus easily disassembled for storage into three sub-assemblies comprising the body 14, brace 20, cradle 28 and web 24; the leveling screw 36, bearing 42 and nut 30; and the support plate 44. In use the nut surface 34 engages the socket 54 to support the web end of the body 14.

In order to prevent rotation of the nut 30 so that rotation of the screw 36 about its own longitudinal axis will result in travel of the nut 30 along the screw toward the head end or other end, the nut 30 has been provided with an integral finger 56 which projects upwardly and radially outwardly from the lower region of the nut 30. The finger 56 extends into an opening 58 in the web 24 adjacent the opening 52. The opening 58 is preferably somewhat oval shaped, having its major axis aligned with the center of the opening 52. The opening 58 is preferably somewhat wider than the diameter of the finger, for instance twice as wide and substantially longer than the diameter of the finger, for instance five-ten times as long. The disparity in size allows the nut 30 to pivot freely with respect to the web 24 even though rotation of the nut 30 is restrained. This result could also be accomplished by providing a mating great circle groove and rib pair on the surface 34 and socket 54 in a vertical plane, but such provision would undoubtedly be more expensive to produce.

To use the leveling device 10, the components are assembled as shown in FIGURES 2 and 3 and the feet 18 and support plate 44 placed on the ground on the lower mast of the sites where the two trailer wheels are to rest. The hex-head 38 is turned in one direction to move the nut 30 downwardly thus lowering the body 14 web end and bringing the cradle 28 into adjacency with the ground. Next the trailed 60 is drawn into position so that the lower 62 of the wheels thereof rests on the cradle 28. The conventional tongue mounted support 64 of the trailer is manipulated to elevate the tongue 66 of the trailer so that an imaginary line drawn along the trailer floor between the higher trailer wheel 68 and the support 64 is level. Finally, the hex-head 38 is rotated in the opposite direction from that previously mentioned to raise the nut 30 and thus the web end of the body and the cradle. Accordingly, the formerly lower wheel 62 is raised to a level condition with respect to the support 64 and wheel 68. A spirit level or the like can be placed on the floor of the trailer to provide an indication of the achievement of the level condition just described. The towing vehicle can be detached from the trailer at any point in the procedure just described when it is no longer needed.

It will be realized upon a moments reflection that as the nut is elevated there will be relative pivoting between the web and nut 30 at the interface 34, 54 because the screw 36 will remain perpendicular to the ground while the web moves from a tilted to a level condition. In the novel device of the present invention, the necessary relative movement is provided at a pivoting point located very close to the web so that there will be no tendency of the plate 44 or web 24 to translate while the trailer is being brought to a level condition. The feet 18 by digging into and engaging the ground also tend to prevent slipping of the device with respect to the ground. Removal of the support provided by the device 10 involves a reversal of the steps just outlined.

It should be realized that the device of the present invention can be used with wheeled vehicles other than trailers and with trailers of other types than that shown in the drawing including those with dual and/or tandem wheels.

It should now be apparent that the device 10 as described accomplishes each of the objects of the invention and clearly illustrates the principles thereof. Because the device 10 can be considerably modified for instance by making the body 14, including the legs 16, feet 18, brace 20, cradle 28 and web 24 of a single convoluted metal plate without departing from these principles or failing to accomplish these objects, the present invention should be understood as encompassing all such modifications as are within the spirit and scope of the following claims.

I claim:

1. Apparatus for leveling a wheeled vehicle of the type having at least one pair of axially aligned wheels spaced transversely of the vehicle comprising: an elongated body; ground engaging means at one end of said body; means at the other end of said body for raising and lowering said body other end with respect to the ground and a cradle intermediate said body one end and said body other end for receiving and supporting one of the wheels of said pair whereby raising and lowering said body other end raises and lowers said wheel respectively to bring said vehicle to a level condition; said body comprising a U-shaped frame of metal, having two legs; said ground engaging means comprising the outer ends of said two legs; and said cradle comprising an upwardly concave element extending between and secured to said two legs intermediate the ends of said body, the concave element being curved about an axis extending in the direction of the elongation of said body.

2. The apparatus of claim 1 wherein the means for raising and lowering said body other end is pivotable about a substantially horizontal axis with respect to said body.

3. The apparatus of claim 1 wherein the body and means for raising and lowering said body other end are connected to one another by ball and socket joint means to provide pivotability between said body and said means for raising and lowering said body other end.

4. The apparatus of claim 1 wherein the two legs are angled adjacent said ends in the same sense of direction out of the plane of the remainder of the frame to define a pair of feet.

5. The apparatus of claim 1 further comprising brace means extending between and secured to said two legs adjacent said ends of said two legs.

6. The apparatus of claim 4 wherein the cradle comprises an upwardly concave element extending between and secured to said two legs intermediate the ends of said body.

7. The apparatus of claim 1 wherein the cradle is composed of metal, and the axis of curvature of the cradle is equidistant from said two legs.

8. The apparatus of claim 1 wherein the cradle is composed of flexible material.

9. The apparatus of claim 1 further comprising a web extending between said two legs at said body other end, the means for raising and lowering said body other end being mounted on said web.

10. The apparatus of claim 9 wherein the web comprises a metal plate secured to the underside of said legs.

11. The apparatus of claim 1 wherein the means for raising and lowering said body other end comprises: an elongated threaded element adapted to be supported at one end thereof on the ground; a threaded element threadably received on said elongated threaded element whereby relative rotation of said elongated threaded element and said threaded element produces axial movement of one of said elongated threaded element and said threaded element along the other; and means operatively joining the axially movable of said elongated threaded element and said threaded element to said body other end, said operatively joining means comprising a pivotable joint; the elongated threaded element being a screw and the threaded element being a nut, said nut having means defining an upper, upwardly convex generally spherically curved surface thereon; said body having means defining a generally vertically directed opening therethrough; means defining a downwardly concave generally spherically curved surface on said body peripherally of said opening, said upwardly convex generally spherically curved surface of the nut being engageable with the downwardly concave generally spherically curved surface on said body to pivotably support said body other end on said nut; the means preventing rotation of said nut with respect to said screw comprising means defining a second opening through said body adjacent the first-mentioned opening; and means defining a finger on said nut projecting outwardly and upwardly into said second opening.

12. The apparatus of claim 11 wherein the screw projects upwardly through the first-mentioned opening, said screw having a non-circular head at the upper extent thereof.

13. The apparatus of claim 12 wherein said one end of said screw is journalled on a support plate which is adapted to rest on the ground.

14. The apparatus of claim 11 wherein the body comprises a U-shaped frame of metal, having two legs; said ground engaging means comprising the ends of said two legs.

References Cited
UNITED STATES PATENTS

| | | | |
|---|---|---|---|
| 274,609 | 3/1883 | Jackson et al. | 254—126 |
| 1,003,735 | 9/1911 | Hackney | 254—4 |
| 1,314,357 | 8/1919 | Olson | 254—127 |
| 3,252,590 | 5/1966 | Nielsen | 254—126 X |

OTHELL M. SIMPSON, *Primary Examiner.*